United States Patent [19]
Koo et al.

[11] Patent Number: 5,677,785
[45] Date of Patent: Oct. 14, 1997

[54] METHOD FOR FORMING AN ARRAY OF THIN FILM ACTUATED MIRRORS

[75] Inventors: Myung-Kwon Koo; Jae-Hyuk Chung, both of Seoul, Rep. of Korea

[73] Assignee: Daewoo Electronics Co., Ltd., Seoul, Rep. of Korea

[21] Appl. No.: 598,478

[22] Filed: Feb. 8, 1996

[30] Foreign Application Priority Data

| Apr. 21, 1995 | [KR] | Rep. of Korea | 95-9390 |
| Apr. 21, 1995 | [KR] | Rep. of Korea | 95-9395 |
| Apr. 29, 1995 | [KR] | Rep. of Korea | 95-10581 |
| Apr. 29, 1995 | [KR] | Rep. of Korea | 95-10582 |
| Jun. 30, 1995 | [KR] | Rep. of Korea | 95-18673 |

[51] Int. Cl.$^6$ ................................................. G02B 26/00
[52] U.S. Cl. ...................... 359/291; 359/224; 359/850; 359/900; 437/229
[58] Field of Search ........................... 359/290, 291, 359/295, 213, 214, 846, 848, 849, 850, 855, 224, 900; 310/328, 366; 437/229; 29/25.35

[56] References Cited

U.S. PATENT DOCUMENTS 5,172,262  12/1992  Hornbeck ........................... 359/291

Primary Examiner—Georgia Y. Epps
Assistant Examiner—Dawn-Marie Bey
Attorney, Agent, or Firm—Anderson Kill & Olick P.C.

[57] ABSTRACT

An inventive method for the manufacture of an array of M×N thin film actuated mirrors for use in an optical projection system includes the steps of: providing an active matrix; depositing a thin film sacrificial layer; creating an array of empty cavities in the thin film sacrificial layer; depositing an elastic layer; forming an array of conduits in the elastic layer; depositing a second thin film, a thin film electrodisplacive and a first thin film layers, successively; patterning the first thin film, the thin film electrodisplacive, the second thin film and the elastic layers, thereby forming an array of actuated mirror structures; forming a thin film protection layer completely covering each of the actuated mirror structures; removing the thin film sacrificial layer by using an etchant; rinsing away the etchant by using a rinse; removing the rinse by drying in a vacuum or by using a spin drying method; and removing the thin film protection layer, thereby forming the array of M×N thin film actuated mirrors.

10 Claims, 7 Drawing Sheets

METHOD FOR FORMING AN ARRAY OF THIN FILM ACTUATED MIRRORS

FIELD OF THE INVENTION

The present invention relates to an optical projection system; and, more particularly, to an improved method for the manufacture of an array of M×N thin film actuated mirrors for use in the system.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1G, there are illustrated manufacturing steps involved in manufacturing an array 100 of M×N thin film actuated mirrors 101, wherein M and N are integers, disclosed in a copending commonly owned application, U.S. Set. No. 08/430,628, entitled "THIN FILM ACTUATED MIRROR ARRAY".

The process for manufacturing the array 100 begins with the preparation of an active matrix 10 having a top surface and comprising a substrate 12, an array of M×N transistors (not shown) and an array of M×N connecting terminals 14.

In a subsequent step, there is formed on the top surface of the active matrix 10 a thin film sacrificial layer 24 by using a sputtering or an evaporation method if the thin film sacrificial layer 24 is made of a metal, a chemical vapor deposition(CVD) or a spin coating method if the thin film sacrificial layer 24 is made of a phosphor-silicate glass (PSG), or a CVD method if the thin film sacrificial layer 24 is made of a poly-Si.

Thereafter, there is formed a supporting layer 20 including an array of M×N supporting members 22 surrounded by the thin film sacrificial layer 24, wherein the supporting layer 20 is formed by: creating an array of M×N empty slots(not shown) on the thin film sacrificial layer 24 by using a photolithography method, each of the empty slots being located around the connecting terminals 14; and forming a supporting member 22 in each of the empty slots located around the connecting terminals 14 by using a sputtering or a CVD method, as shown in FIG. 1A. The supporting members 22 are made of an insulating material.

In a following step, an elastic layer 30 made of the same insulating material as the supporting members 22 is formed on top of the supporting layer 20 by using a Sol-Gel, a sputtering or a CVD method.

Subsequently, a conduit 26 made of a metal is formed in each of the supporting members 22 by: first creating an array of M×N holes(not shown), each of the holes extending from top of the elastic layer 30 to top of the connecting terminals 14, by using an etching method; and filling therein with the metal to thereby form the conduit 26, as shown in FIG. 1B.

In a next step, a second thin film layer 40 made of an electrically conducting material is formed on top of the elastic layer 30 including the conduits 26 by using a sputtering method. The second thin film layer 40 is electrically connected to the transistors through the conduits 26 formed in the supporting members 22.

Then, a thin film electrodisplacive layer 50 made of a piezoelectric material, e.g., lead zirconium titanate(PZT), is formed on top of the second thin film layer 40 by using a sputtering method, a CVD method or a Sol-Gel method, as shown in FIG. 1C.

In an ensuing step, the thin film electrodisplacive layer 50, the second thin film layer 40 and the elastic layer 30 are patterned into an array of M×N thin film electrodisplacive members 55, an array of M×N second thin film electrodes 45 and an array of M×N elastic members 35 by using a photolithography or a laser trimming method until the supporting layer 20 is exposed, as shown in FIG. 1D. Each of the second thin film electrodes 45 is electrically connected to the transistor through the conduit 26 formed in each of the supporting members 22 and functions as a signal electrode in the thin film actuated mirrors 101.

Next, each of the thin film electrodisplacive members 55 is heat treated to allow a phase transition to take place to thereby form an array of M×N heat treated structures(not shown). Since each of the heat treated thin film electrodisplacive members 55 is sufficiently thin, there is no need to pole it in case it is made of a piezoelectric material: for it can be poled with the electric signal applied during the operation of the thin film actuated mirrors 101.

After the above step, an array of M×N first thin film electrodes 65 made of an electrically conducting and light reflecting material is formed on top of the thin film electrodisplacive members 55 in the array of M×N heat treated structures by first forming a layer 60, made of the electrically conducting and light reflecting material, completely covering top of the array of M×N heat treated structures, including the exposed supporting layer 20, using a sputtering method, as shown in FIG. 1E, and then selectively removing the layer 60, using an etching method, resulting in an array 110 of M×N actuated mirror structures 111, wherein each of the actuated mirror structures 111 includes a top surface and four side surfaces, as shown in FIG. 1F. Each of the first thin film electrodes 65 functions as a mirror as well as a bias electrode in the thin film actuated mirrors 101.

The preceeding step is then followed by completely covering the top surface and the four side surfaces in each of the actuated mirror structures 111 with a thin film protection layer(not shown).

The thin film sacrificial layer 24 in the supporting layer 20 is then removed by using an wet etching method. Finally, the thin film protection layer is removed to thereby form the array 100 of M×N thin film actuated mirrors 101, as shown in FIG. 1G.

There are certain deficiencies associated with the above described method for manufacturing the array 100 of M×N thin film actuated mirrors 101. The removal of the thin film sacrificial layer 24 by using an etchant or a chemical is, generally, followed by a rinsing of the etchant or the chemical used by using a rinse, e.g., distilled water or methanol, and then by a removal of the rinse by evaporating thereof. During the removal of the rinse, however, the surface tension of the rinse may pull the elastic member 35 down toward the active matrix 10, thereby sticking the elastic member 35 to the active matrix 10, affecting the performance of the respective thin film actuated mirror 101. When enough of the thin film actuated mirrors 101 are thus affected, the overall performance of the array 100 may also degrade.

SUMMARY OF THE INVENTION

It is, therefore, a primary object of the present invention to provide a method for manufacture of an array of M×N thin film actuated mirrors for use in an optical projection system capable of reducing the occurrence of the elastic member sticking to the active matrix during the removal of the rinse.

In accordance with one aspect of the present invention, there is provided a method for the manufacture of an array of M×N thin film actuated mirrors, wherein M and N are integers, for use in an optical projection system, the method comprising the steps of: providing an active matrix including a substrate, an array of M×N connecting terminals and an array of M×N transistors, wherein each of the connecting terminals is electrically connected to a corresponding transistor in the array of the transistors; depositing a thin film sacrificial layer on top of the active matrix; creating an array of M×N pairs of empty cavities in the thin film sacrificial layer, one of the empty cavities in each pair encompassing one of the connecting terminals; depositing an elastic layer, made of an insulating material, on top of the thin film sacrificial layer including the empty cavities; forming an array of M×N conduits in the elastic layer, each of the conduits extending from top of the elastic layer to top of a corresponding connecting terminal; depositing a second thin film, a thin film electrodisplacive and a first thin film layers, successively, on top of the elastic layer, wherein the second thin film layer is made of an electrically conducting material, and the first thin film layer is made of an electrically conducting and light reflecting material; patterning the first thin film, the thin film electrodisplacive, the second thin film and the elastic layers, respectively, into an array of M×N first thin film electrodes, an array of M×N thin film electrodisplacive members, an array of M×N second thin film electrodes and an array of M×N elastic members, until the thin film sacrificial layer is exposed, thereby forming an array of M×N actuated mirror structures, each of the actuated mirror structures having a top surface and side surfaces, and including the first thin film electrode, the thin film electrodisplacive member, the second thin film electrode and the elastic member; forming a thin film protection layer completely covering the top surface and the side surfaces of each of the actuated mirror structures; removing the thin film sacrificial layer by using an etchant; rinsing away the etchant by using a first rinse; removing the first rinse; and removing the thin film protection layer, thereby forming the array of M×N thin film actuated mirrors.

BRIEF DESCRIPTION OF THE DRAWINGS

The above and other objects and features of the present invention will become apparent from the following description of the preferred embodiments, when given in conjunction with the accompanying drawings, wherein.

DETAILED DESCRIPTION OF THE PREFERRED EMBODIMENTS

Figure 1A:
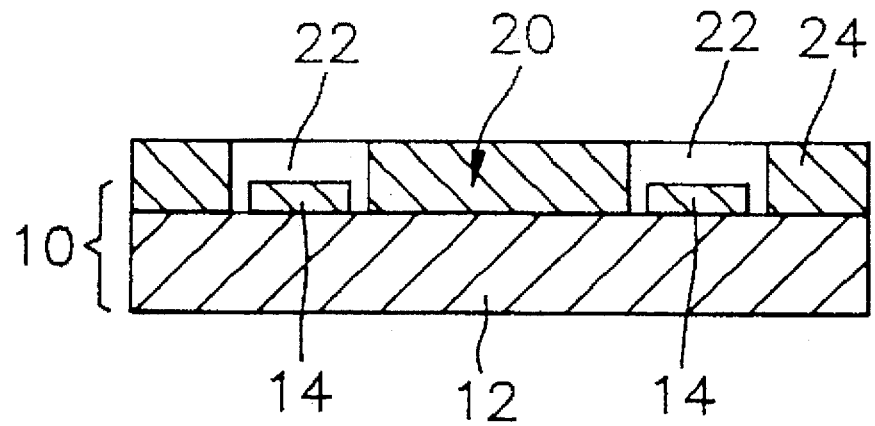
FIGS. 1A to 1G are schematic cross sectional views illustrating a method for the manufacture of an array of M×N thin film actuated mirrors previously disclosed.
Figure 1B:
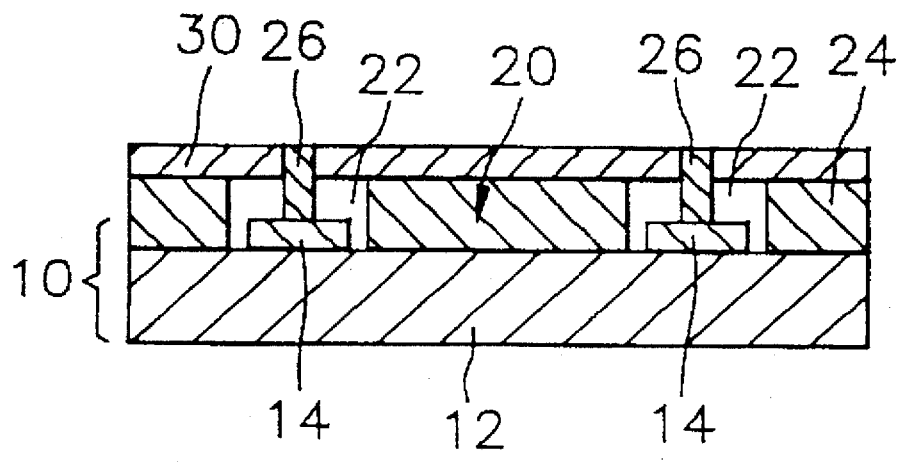
Figure 1C:
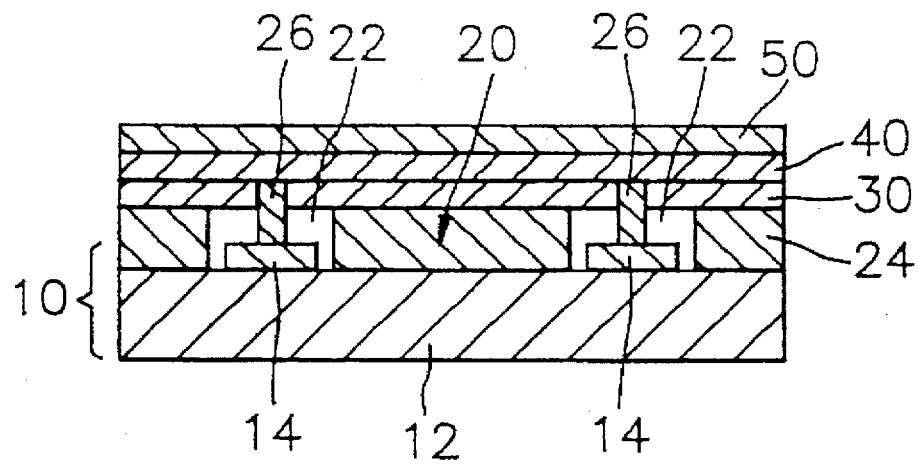
Figure 1D:
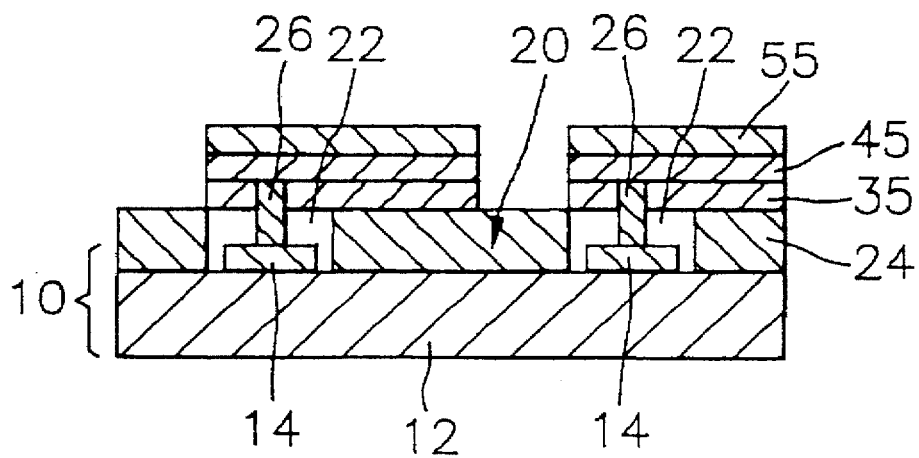
Figure 1E:
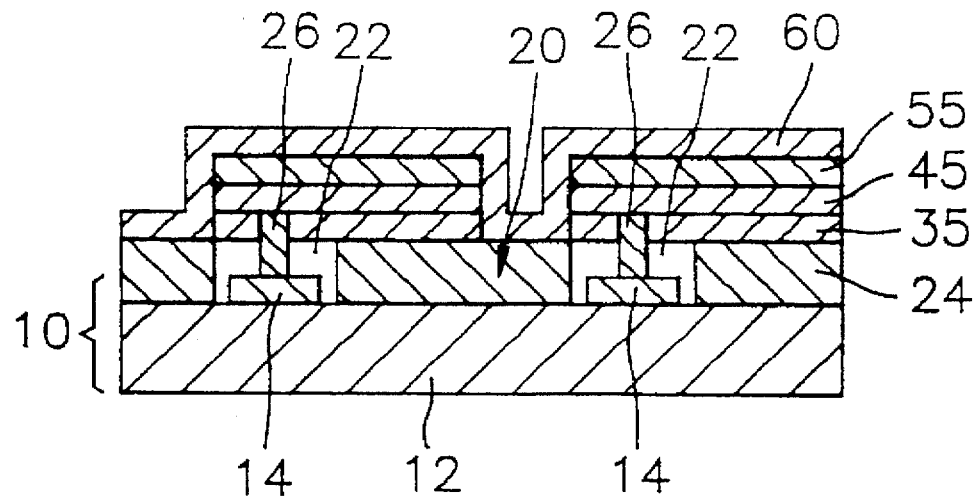
Figure 1F:
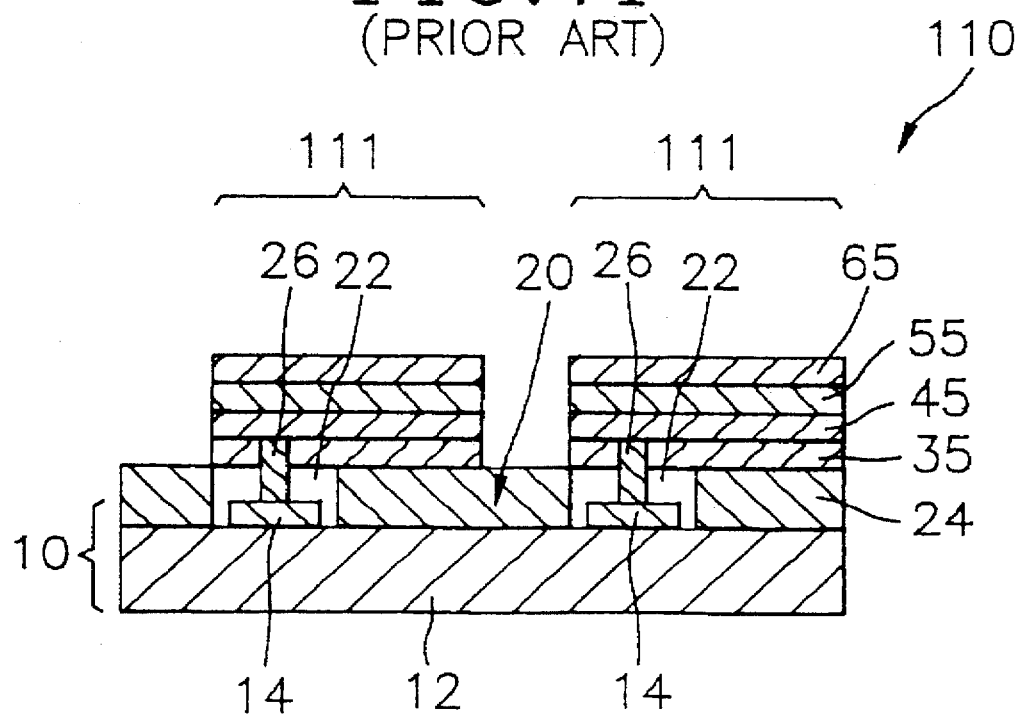
Figure 1G:
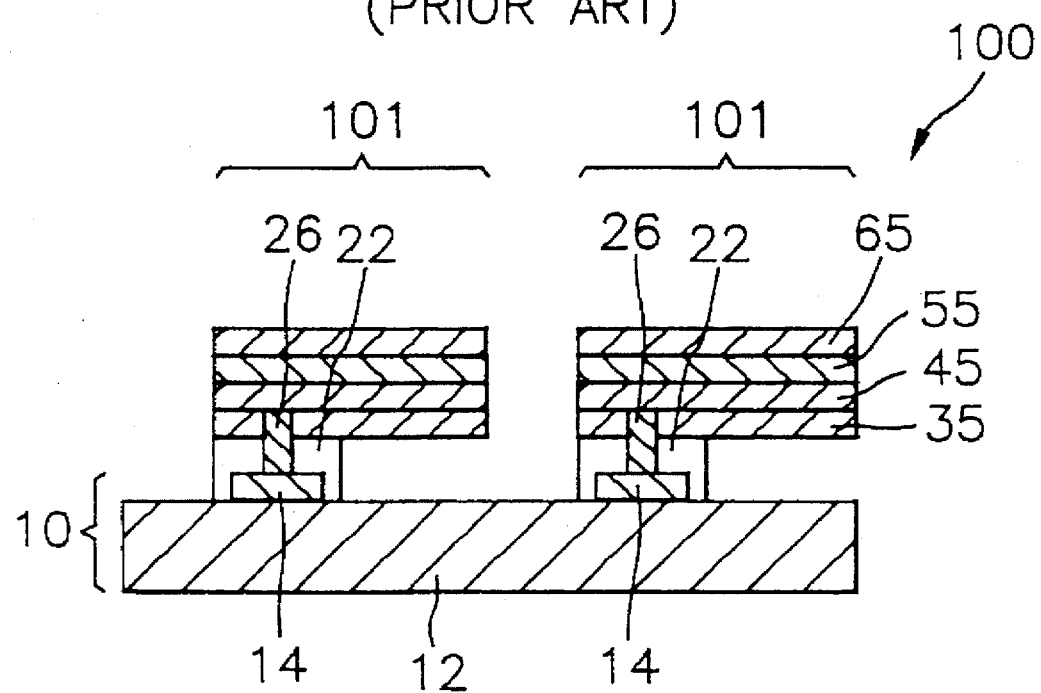

There are provided in FIGS. 2A to 2F schematic cross sectional views setting forth a method for the manufacture of an array 300 of M×N thin film actuated mirrors 301, wherein M and N are integers, for use in an optical projection system. It should be noted that like parts appearing in FIGS. 2A to 2F are represented by like reference numerals.

The process for the manufacture of the array 300 begins with the preparation of an active matrix 210 including a substrate 212 with an array of M×N connecting terminals 214 and an array of M×N transistors(not shown), wherein each of the connecting terminals 214 is electrically connected to a corresponding transistor in the array of transistors, and the substrate 212 is made of an insulating material, e.g., Si-wafer.

In a subsequent step, there is formed on top of the active matrix 210 a thin film sacrificial layer 224, having a thickness of 0.1–2 µm, and made of a metal, e.g., copper(Cu) or nickel(Ni), a phosphor-silicate glass(PSG) or a poly-Si. The thin film sacrificial layer 224 is formed by using a sputtering or an evaporation method if the thin film sacrificial layer 224 is made of a metal, a chemical vapor deposition(CVD) method or a spin coating method if the thin film sacrificial layer 224 is made of a PSG, and a CVD method if the thin film sacrificial layer 224 is made of a poly-Si.

Thereafter, there is formed an array of M×N pairs of empty cavities(not shown) in the thin film sacrificial layer 224 by using an wet or a dry etching method. One of the empty cavities in each pair encompasses one of the connecting terminals 214.

Subsequently, an elastic layer 230, made of an insulating material, e.g., silicon nitride, and having a thickness of 0.1–2 µm, is deposited on top of the thin film sacrificial layer 224 including the empty cavities by using a CVD method.

Figure 2A:
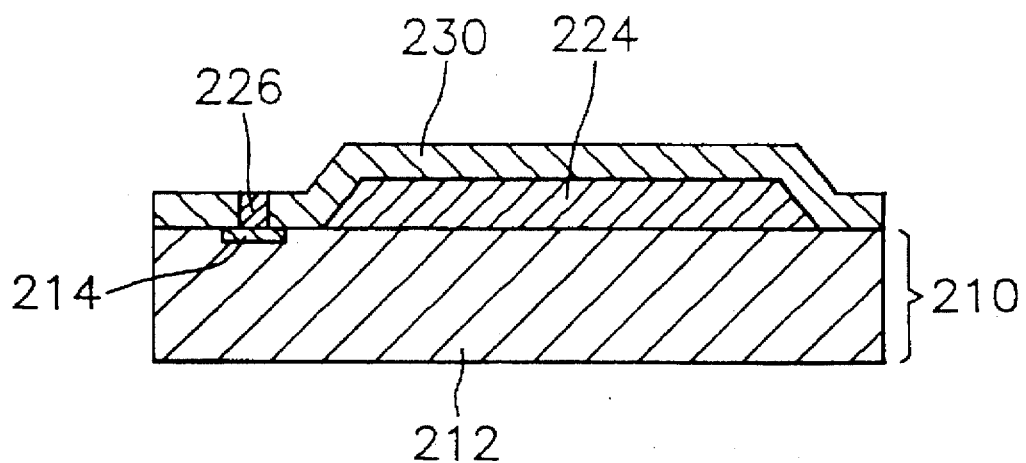
FIGS. 2A to 2F are schematic cross sectional views setting forth a method for the manufacture of an array of M×N thin film actuated mirrors in accordance with the present invention.

Thereafter, there is formed in the elastic layer 230 an array of M×N conduits 226 made of a metal, e.g., tungsten(W). Each of the conduits 226 is formed by: first creating an array of M×N holes(not shown), each of the holes extending from top of the elastic layer 230 to top of a corresponding connecting terminal 214 by using an etching method; and filling therein with the metal by using, e.g., a lift-off method, as shown in FIG. 2A.

Then, a second thin film layer 240, made of an electrically conducting material, e.g., aluminum(Al), and having a thickness of 0.1–2 µm, is formed on top of the elastic layer 230 including the conduits 226 by using a sputtering or a vacuum evaporation method.

Next, a thin film electrodisplacive layer 250, made of a piezoelectric material, e.g., lead zirconium titanate(PZT), or an electrostrictive material, e.g., lead magnesium niobate (PMN), and having a thickness of 0.1–2 µm, is formed on top of the second thin film layer 240 by using a CVD method, an evaporation method, a Sol-Gel method or a sputtering method. The thin film electrodisplacive layer 250 is then heat treated to allow a phase transition to take place.

Figure 2B:
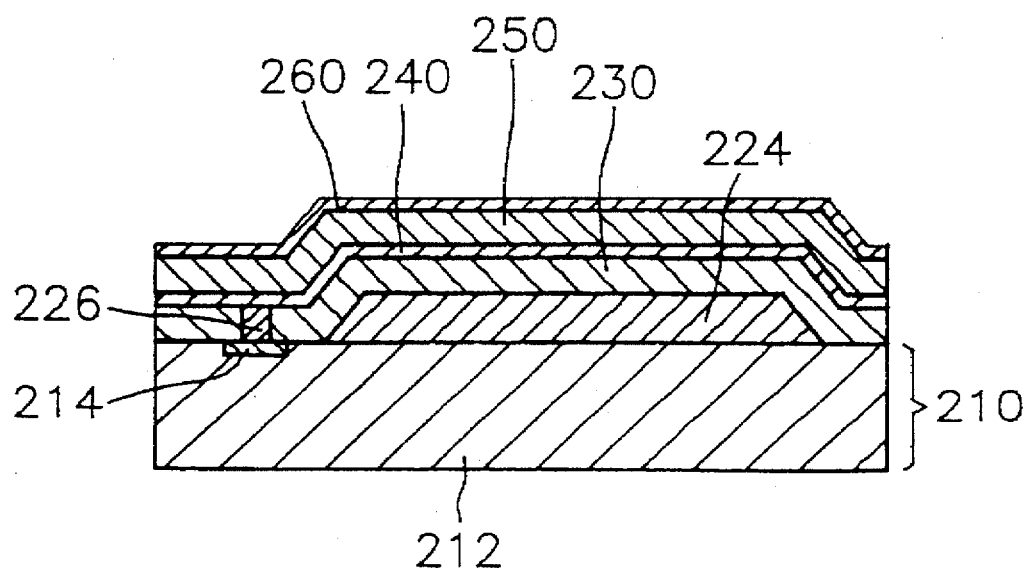

In an ensuing step, a first thin film layer 260, made of an electrically conducting and light reflecting material, e.g., aluminum(Al) or silver(Ag), and having a thickness of 0.1–2 µm, is formed on top of the thin film electrodisplacive layer 250 by using a sputtering or a vacuum evaporation method, as shown in FIG. 2B.

Figure 2C:
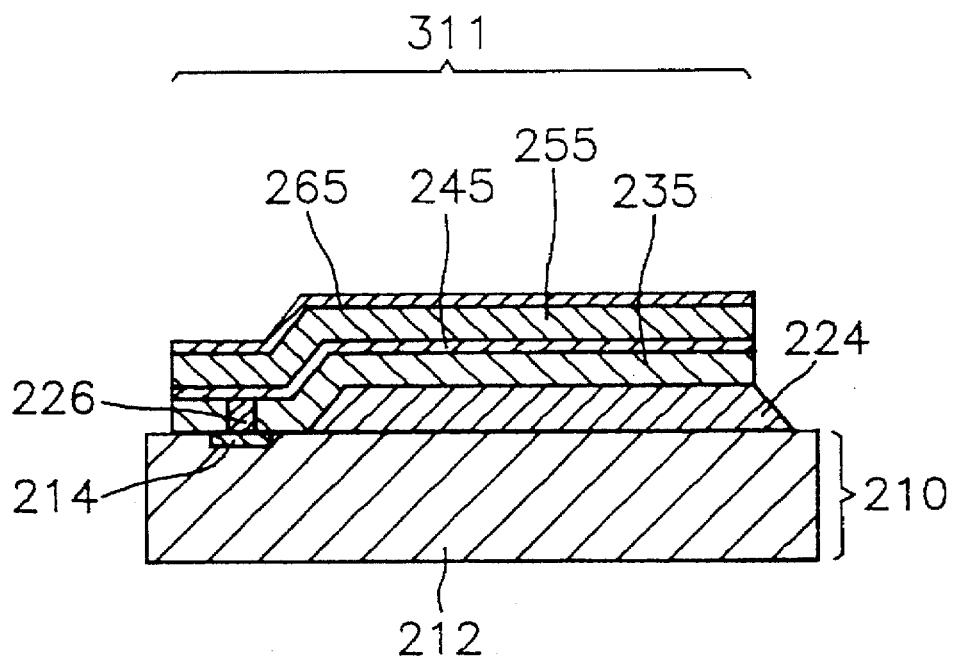

After the above step, the first thin film 260, the thin film electrodisplacive 250, the second thin film 240 and the elastic layers 230 are patterned into an array of M×N first thin film electrodes 265, an array of M×N thin film electrodisplacive members 255, an array of M×N second thin film electrodes 245 and an array of M×N elastic members 235 by using a photolithography or a laser trimming method, thereby forming an array 310 of M×N actuated mirror structures 311, each of the actuated mirror structures 311 having a top surface and side surfaces, as shown in FIG. 2C. Each of the second thin film electrodes 245 is electrically connected to a corresponding connecting terminal 214 through the conduit 226, thereby functioning as a signal electrode in each of the thin film actuated mirrors 301. Each of the first thin film electrodes 265 functions as a mirror as well as a bias electrode therein.

Since each of the thin film electrodisplacive members 255 is sufficiently thin, there is no need to pole it in case it is made of a piezoelectric material: for it can be poled with the electric signal applied during the operation of the thin film actuated mirrors 301.

Figure 2D:
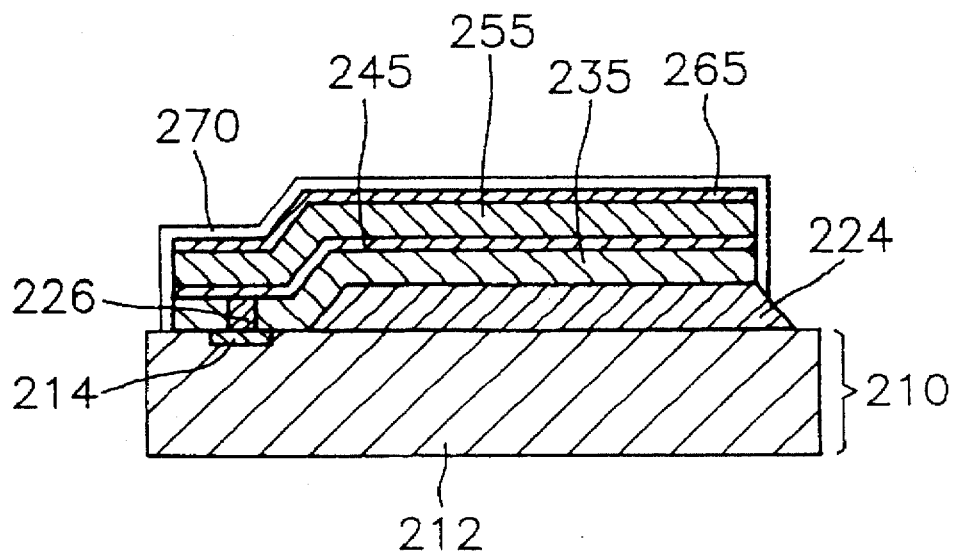

The preceeding step is then followed by completely covering the top surface and the side surfaces in each of the actuated mirror structures 311 with a thin film protection layer 270, as shown in FIG. 2D.

Figure 2E:
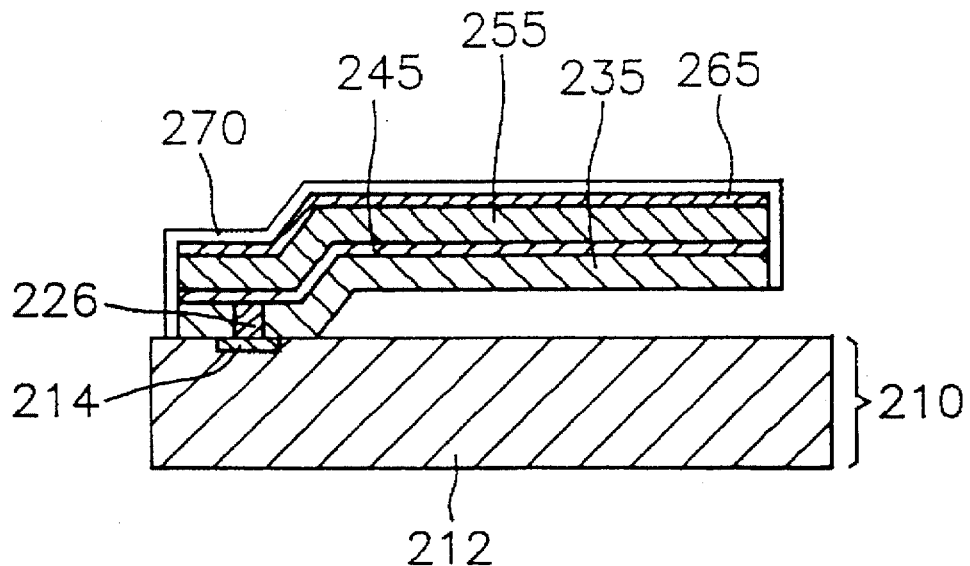

The thin film sacrificial layer 224 is then removed by using an etchant, e.g., hydrogen fluoride(HF), as shown in FIG. 2E.

The etchant used in the removal of the thin film sacrificial layer 224 is rinsed away by using a rinse, e.g., deionized water or methanol. The rinse is then removed by drying in a vacuum or by using a spin drying method.

In an ensuing step, the thin film protection layer 270 is removed by using an etching method, e.g., a plasma etching method.

Figure 2F:
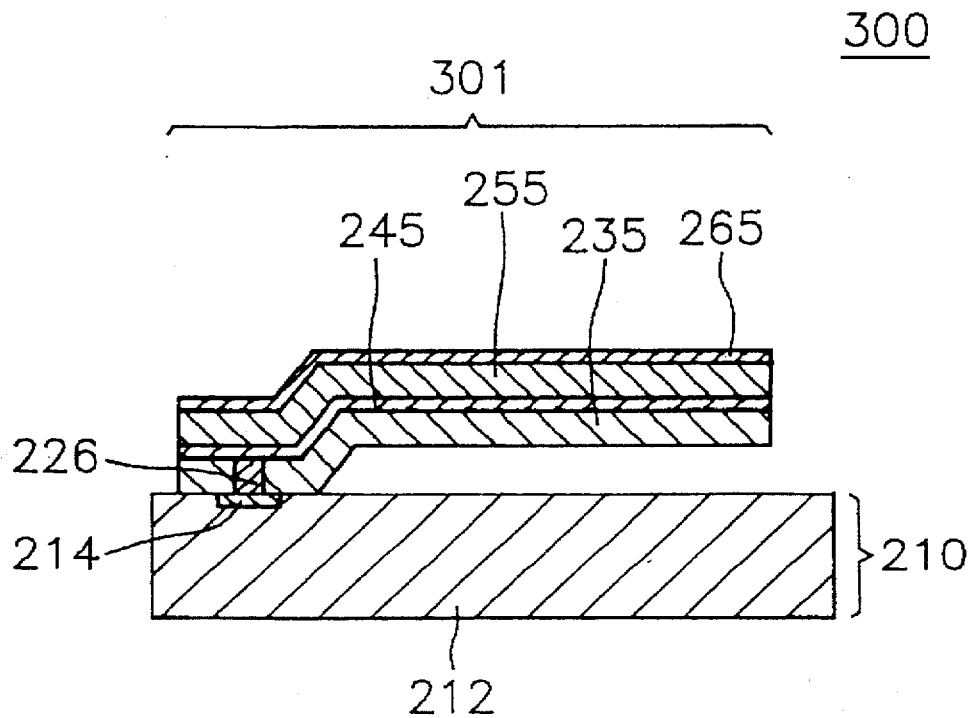

Then, remnants of the thin film protection layer 270 still remaining after the removal thereof are removed by using a chemical, e.g., advanced chemical technology(ACT)-CML. The chemical used in the removal of the remnants of the thin film protection layer 270 is rinsed away by using a rinse, e.g., deionized water or methanol. The rinse is then removed by drying in a vacuum or by using a spin drying method thereby forming the array 300 of M×N thin film actuated mirrors 301, as shown in FIG. 2F.

In contrast with the method for the manufacture of the array 100 of M×N thin film actuated mirrors 101 previously disclosed, in the inventive method, since the removal of the rinse is achieved by drying the array 300 in a vacuum or by using a spin drying method, the effect of the surface tension of the rinse can be minimized and there is less likelihood of the elastic member 235 sticking to the active matrix 210.

It should be mentioned that, even though, each of the thin film actuated mirrors 301 prepared using the inventive method has an unimorph structure, the inventive method can be equally well applied to manufacturing an array of thin film actuated mirrors, each of the thin film actuated mirrors having a bimorph structure, for the latter case just involves formation of additional electrodisplacive and electrode layers.

It should be further noted that the inventive method can be modified to allow a manufacturing an array of thin film actuated mirrors having a different geometry.

While the present invention has been described with respect to certain preferred embodiments only, other modifications and variations may be made without departing from the scope of the present invention as set forth in the following claims.

What is claimed is:

1. A method for the manufacture of an array of M×N thin film actuated mirrors, wherein M and N are integers, for use in an optical projection system, the method comprising the steps of:

providing an active matrix including a substrate, an array of M×N connecting terminals and an array of M×N transistors, wherein each of the connecting terminals is electrically connected to a corresponding transistor in the array of the transistors;

depositing a thin film sacrificial layer on top of the active matrix;

creating an array of M×N pairs of empty cavities in the thin film sacrificial layer, one of the empty cavities in each pair encompassing one of the connecting terminals;

depositing an elastic layer, made of an insulating material, on top of the thin film sacrificial layer including the empty cavities;

forming an array of M×N conduits in the elastic layer, each of the conduits extending from top of the elastic layer to top of a corresponding connecting terminal;

depositing a second thin film, a thin film electrodisplacive and a first thin film layers, successively, on top of the elastic layer, wherein the second thin film layer is made of an electrically conducting material, and the first thin film layer is made of an electrically conducting and light reflecting material;

patterning the first thin film, the thin film electrodisplacive, the second thin film and the elastic layers, respectively, into an array of M×N first thin film electrodes, an array of M×N thin film electrodisplacive members, an array of M×N second thin film electrodes and an array of M×N elastic members, until the thin film sacrificial layer is exposed, thereby forming an array of M×N actuated mirror structures, each of the actuated mirror structures having a top surface and side surfaces, and including the first thin film electrode, the thin film electrodisplacive member, the second thin film electrode and the elastic member;

forming a thin film protection layer completely covering the top surface and the side surfaces of each of the actuated mirror structures;

removing the thin film sacrificial layer by using an etchant;

rinsing away the etchant by using a first rinse;

removing the first rinse; And removing the thin film protection layer, thereby forming the array of M×N thin film actuated mirrors.

2. The method of claim 1, wherein the etchant used in the removal of the thin film sacrificial layer is hydrogen fluoride (HF).

3. The method of claim 1, wherein the thin film protection layer is removed by using a plasma etching method.

4. The method of claim 1, after the removal of the thin film protection layer, further involves the steps of:

removing remnants of the thin film protection layer by using a chemical;

rinsing away the chemical by using a second rinse; and removing the second rinse.

5. The method of claim 4, wherein the first rinse and the second rinse are deionized water or methanol.

6. The method of claim 4, wherein the first rinse and the second rinse are removed by drying in a vacuum.

7. The method of claim 4, wherein the first rinse and the second rinse are removed by using a spin drying method.

8. The method of claim 4, wherein the chemical used in the removal of the remnants of the thin film protection layer is advanced chemical technology(ACT)-CMI.

9. The method of claim 1, wherein each of the thin film actuated mirrors has a bimorph structure.

10. The method of claim 1, further involves the formation of additional electrode and electrodisplacive layers, successively, after depositing the electrodisplacive layer.

* * * * *